(12) United States Patent
Leabman et al.

(10) Patent No.: US 9,876,380 B1
(45) Date of Patent: Jan. 23, 2018

(54) SECURED WIRELESS POWER DISTRIBUTION SYSTEM

(71) Applicant: ENERGOUS CORPORATION, San Jose, CA (US)

(72) Inventors: Michael Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 59 days.

(21) Appl. No.: 14/586,137

(22) Filed: Dec. 30, 2014

Related U.S. Application Data (63) Continuation-in-part of application No. 14/026,747, filed on Sep. 13, 2013, now abandoned.

(51) Int. Cl.
*G06F 1/00* (2006.01)
*H02J 7/02* (2016.01)
*H02J 50/20* (2016.01)

(52) U.S. Cl.
CPC .............. *H02J 7/025* (2013.01); *H02J 50/20* (2016.02)

(58) Field of Classification Search
CPC ................................. H02J 7/025; H02J 50/20
USPC ........................................................ 713/300
See application file for complete search history.

(56) References Cited

U.S. PATENT DOCUMENTS

| | | | |
|---|---|---|---|
| 4,360,741 A | 11/1982 | Fitzsimmons et al. | |
| 5,712,642 A | 1/1998 | Hulderman | |
| 5,936,527 A | 8/1999 | Isaacman et al. | |
| 5,982,139 A | 11/1999 | Parise | |
| 6,127,799 A | 10/2000 | Krishnan | |
| 6,127,942 A | 10/2000 | Welle | |
| 6,289,237 B1 | 9/2001 | Mickle et al. | |
| 6,615,074 B2 | 9/2003 | Mickle et al. | |
| 6,798,716 B1 | 9/2004 | Charych | |
| 6,856,291 B2 | 2/2005 | Mickle et al. | |
| 6,960,968 B2 | 11/2005 | Odendaal et al. | |
| 6,967,462 B1 | 11/2005 | Landis | |
| 7,003,350 B2 | 2/2006 | Denker et al. | |
| 7,027,311 B2 | 4/2006 | Vanderelli et al. | |

(Continued)

FOREIGN PATENT DOCUMENTS

| | | |
|---|---|---|
| EP | 2545635 A2 | 1/2013 |
| KR | 1020130026977 A | 3/2013 |

(Continued)

OTHER PUBLICATIONS

International Search Report dated Jan. 27, 2015 corresponding to International Patent Application No. PCT/US2014/037170, 4 pages.

(Continued)

*Primary Examiner* — Nitin Patel
(74) *Attorney, Agent, or Firm* — Morgan, Lewis & Bockius LLP (57) ABSTRACT

A wireless power distribution system for military applications is disclosed. The system includes a wireless power transmitter coupled with a power source. The transmitter may form pockets of energy using controlled radio frequencies. Electrical equipment coupled with an electronic receiver may utilize pockets of energy formed by the transmitter to charge or power the electrical equipment. The transmitter coupled with a power source may be used in a fixed position or may be carried in a vehicle for portability.

19 Claims, 6 Drawing Sheets

(56) References Cited

U.S. PATENT DOCUMENTS

| | | |
|---|---|---|
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,380,255 B2 | 2/2013 | Shearer et al. |
| 8,410,953 B2 | 4/2013 | Zeine |
| 8,432,062 B2 | 4/2013 | Greene et al. |
| 8,446,248 B2 | 5/2013 | Zeine |
| 8,447,234 B2 | 5/2013 | Cook et al. |
| 8,461,817 B2 | 6/2013 | Martin et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 9,124,125 B2 | 9/2015 | Leabman et al. |
| 2005/0007276 A1 | 1/2005 | Barrick et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0309452 A1 | 12/2008 | Zeine |
| 2009/0200985 A1 | 8/2009 | Zane et al. |
| 2009/0243397 A1 | 10/2009 | Cook et al. |
| 2010/0027379 A1 | 2/2010 | Saulnier et al. |
| 2010/0033021 A1 | 2/2010 | Bennett |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0295372 A1 | 11/2010 | Hyde et al. |
| 2010/0309079 A1 | 12/2010 | Rofougaran et al. |
| 2010/0315045 A1* | 12/2010 | Zeine ............. H02J 7/025 320/137 |
| 2011/0031928 A1 | 2/2011 | Soar |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0254503 A1 | 10/2011 | Widmer et al. |
| 2011/0278941 A1 | 11/2011 | Krishna et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0146576 A1 | 6/2012 | Partovi |
| 2012/0157019 A1 | 6/2012 | Li |
| 2012/0187851 A1* | 7/2012 | Huggins ............. H05B 37/0218 315/159 |
| 2012/0193999 A1 | 8/2012 | Zeine |
| 2012/0248891 A1 | 10/2012 | Drennen |
| 2012/0249051 A1 | 10/2012 | Son et al. |
| 2012/0274154 A1 | 11/2012 | DeLuca |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0169061 A1* | 7/2013 | Miroshnichenko .. H04B 5/0037 307/104 |
| 2013/0207604 A1 | 8/2013 | Zeine |
| 2013/0241468 A1* | 9/2013 | Moshfeghi ............. H02J 7/025 320/107 |
| 2013/0241474 A1 | 9/2013 | Moshfeghi |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0368048 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |

FOREIGN PATENT DOCUMENTS

| | | |
|---|---|---|
| WO | 9952173 A2 | 10/1999 |
| WO | 2004077550 A1 | 9/2004 |
| WO | 2003091943 A1 | 11/2006 |
| WO | 2008156571 A2 | 12/2008 |
| WO | 2010022181 A1 | 2/2010 |
| WO | 2011112022 A2 | 9/2011 |
| WO | 2013035190 A1 | 3/2013 |
| WO | 2013052950 A1 | 4/2013 |

OTHER PUBLICATIONS

International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
International Search Report dated Sep. 12, 2014 corresponding to International Patent Application No. PCT/US2014/037072, 3 pages.
International Search Report dated Dec. 18, 2014 corresponding to International Patent Application No. PCT/US2014/054891, 3 pages.
Written Opinion of the International Searching Authority dated Dec. 18, 2014 corresponding to International Patent Application No. PCT/US2014/054891, 9 pages.

* cited by examiner

SECURED WIRELESS POWER DISTRIBUTION SYSTEM

CROSS-REFERENCES TO RELATED APPLICATIONS

This application is a continuation-in-part of U.S. Non-Provisional patent application Ser. No. 14/026,747, filed on Sep. 13, 2013, which is herein fully incorporated by reference in its entirety.

This application is related to U.S. Non-Provisional patent application Ser. No. 13/925,469, filed on Jun. 24, 2013, entitled "Methodology for Multiple Pocket-Forming;" U.S. patent Non-Provisional application Ser. No. 13/946,082, filed on Jul. 19, 2013, entitled "Method for 3 Dimensional Pocket-forming;" U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," and U.S. Non-Provisional patent application Ser. No. 14/583,643, filed Dec. 27, 2014, entitled "Method for 3 Dimensional Pocket-Forming," all of which are herein fully incorporated by reference in their entirety.

FIELD OF INVENTION

The present disclosure relates to electrical power distribution, and more particularly to wireless power distribution on military expeditions and camps.

BACKGROUND

In military situations, electrical energy becomes indispensable to support the front line and enable defense personnel to live, work, train and deploy at home and overseas or remote locations. Many electrical devices used on the field may require a source of power and thus, batteries are carried, and mobile power generators are transported and installed in remote locations. Power generators may include: mobile diesel generators, solar photovoltaic arrays, wind turbines or any source that serves as an electrical power source. Usually when a military expedition arrives in a new location, installation of a power distribution system is necessary, which usually involves complex, tedious and time consuming wired connections. Military camps or settlements may also be required to move from one location to another frequently, which may incur in continuously installing and uninstalling the power distribution system. Installing and uninstalling the power distribution system may be a tedious process.

When engaged in combat, soldiers may carry equipment such as radios, night vision goggles, rifle scopes and/or other military equipment that may require an electrical power source. Soldiers carry batteries as a power source for these devices; however, carrying batteries adds additional weight to the equipment each soldier carries and switching old used batteries for new ones under the stress of battle may be troubling and impractical in some situations.

Thus, a need exists for an electrical power source that addresses the aforementioned issues.

SUMMARY

The present disclosure is a power distribution system for military applications. The power distribution system includes a wireless transmitter coupled with a power generator source such as a mobile diesel generator, a solar photovoltaic array, wind turbines or any reliable power source or combination thereof. The wireless power transmitter uses energy from the power generator source and creates pockets of energy at different determined locations. Electrical devices may be coupled with wireless receiver components that may use the pockets of energy to charge or power the electrical devices. The power distribution system may avoid tedious wired connections and may be more easily installed and uninstalled.

A method for a wireless power distribution system for military applications, comprising the steps of: transmitting controlled radio frequency waves from a pocket-forming transmitter to converge pockets of energy in 3-d space to form the wireless power distribution system; connecting a power source to the transmitter, and capturing the pockets of energy by a receiver to charge or power an electronic device connected to the receiver in the wireless power distribution system.

A method for a wireless power distribution system for military applications comprising the step of transmitting pockets of energy from a pocket-forming transmitter including a housing suitable for battlefield use, at least two antenna elements, at least one RF integrated circuit, at least one digital signal processor having security logic and a communication component and the step of receiving the pockets of energy by a receiver connected to an electronic device having a battery including a housing for battlefield use, at least one antenna element, one rectifier, one power converter, a security code and a communication component to establish communication with the pocket-forming transmitter for continuing to receive the pockets of energy from the pocket-forming transmitter while the electronic device is mobile and within a predetermined range of the transmitter with the security code of the receiver recognized by the security logic of the transmitter.

In another embodiment the wireless transmitter may be mounted with the power source over a vehicle in order to provide mobility. The vehicle may accompany soldiers into the battlefield and provide wireless energy to any electrical devices the soldiers may use, which may in turn prevent the need to use replaceable batteries.

BRIEF DESCRIPTION OF THE DRAWINGS

Embodiments of the present disclosure are described by way of example with reference to the accompanying figures, which are schematic and are not intended to be drawn to scale. Unless indicated as representing prior art, the figures represent aspects of the present disclosure.

DETAILED DESCRIPTION

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device which may include at least one antenna, at least one rectifying circuit and at least one power converter for powering or charging an electronic device using RF waves, "Adaptive pocket-forming" may refer to dynamically adjusting pocket-forming to regulate power on one or more targeted receivers.

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings, and claims, are not meant to be limiting. Other embodiments may be used and/or and other changes may be made without departing from the spirit or scope of the present disclosure.

Figure 1:
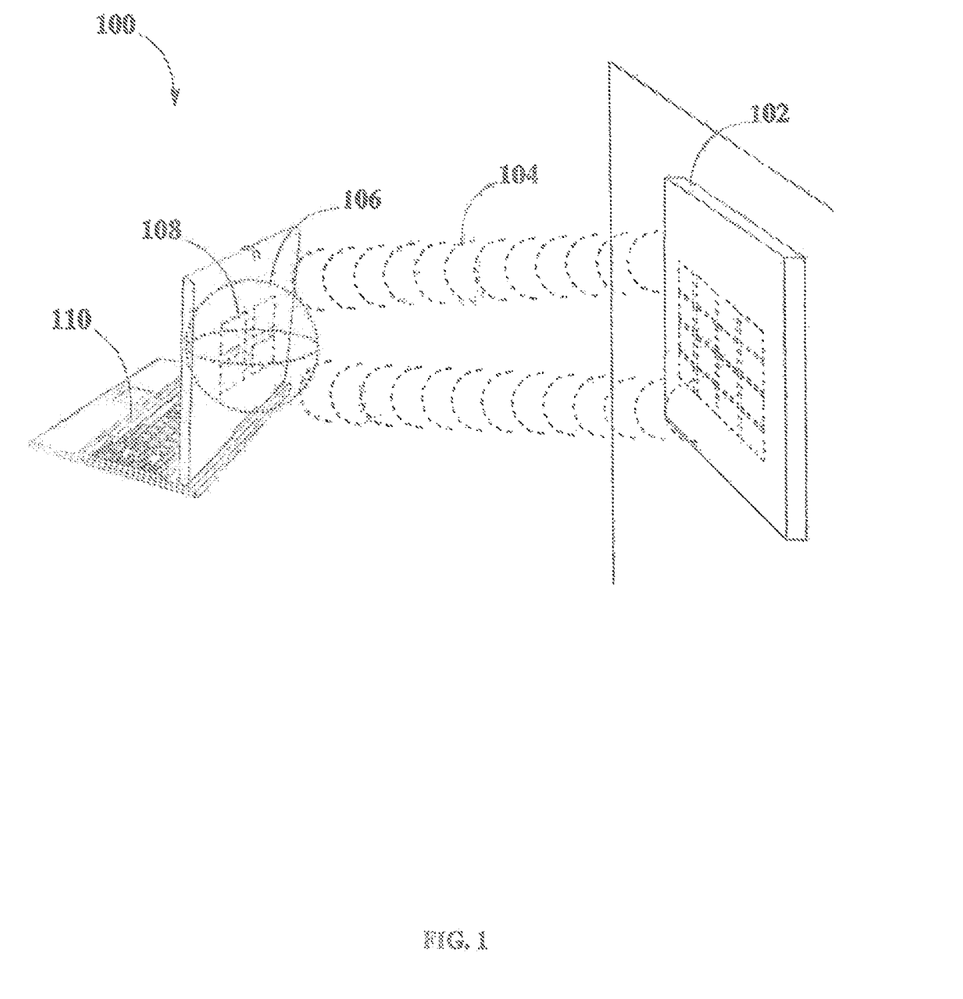
FIG. 1 illustrates wireless power transmission using pocket-forming, according to an exemplary embodiment.

FIG. 1 illustrates wireless power transmission 100 using pocket-forming. A transmitter 102 may transmit controlled Radio Frequency (RF) waves 104 which may converge in 3-d space. These RF waves may be controlled through phase and/or relative amplitude adjustments to form constructive and destructive interference patterns (pocket-forming). Pockets of energy 106 may form at constructive interference patterns and can be 3-dimensional in shape whereas null-spaces may be generated at destructive interference patterns. A receiver 108 may then utilize pockets of energy produced by pocket-forming for charging or powering an electronic device, for example a laptop computer 110 and thus effectively providing wireless power transmission 100. In some embodiments, there can be multiple transmitters 102 and/or multiple receivers 108 for powering various electronic devices, for example smartphones, tablets, music players, toys and others at the same time. In other embodiments, adaptive pocket-forming may be used to regulate power on electronic devices.

Figure 2:
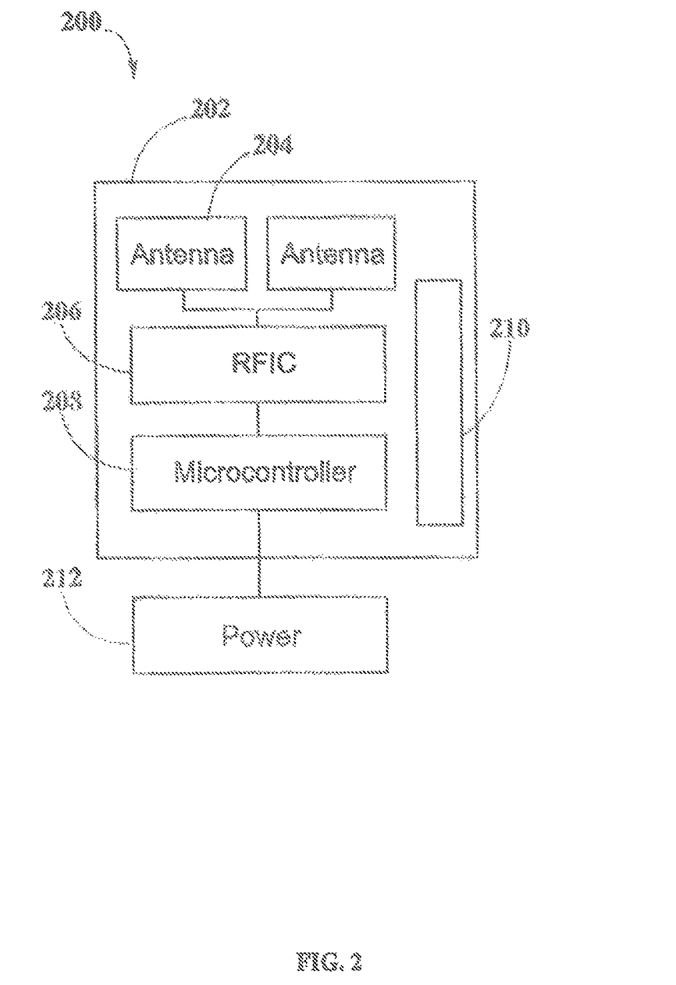
FIG. 2 illustrates a component level embodiment for a transmitter, according to an exemplary embodiment.

FIG. 2 illustrates a component level embodiment for a transmitter 200 which may be utilized to provide wireless power transmission 100 as described in FIG. 1. Transmitter 200 may include a housing 202 where at least two or more antenna elements 204, at least one RF integrated circuit (RFIC 206), at least one digital signal processor (DSP) or micro-controller 208, and one optional communications component 210 may be included. Housing 202 can be made of any suitable material which may allow for signal or wave transmission and/or reception, for example plastic or hard rubber. Antenna elements 204 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 204 may include vertical or horizontal polarization, right hand or left hand polarization, elliptical polarization, or other suitable polarizations as well as suitable polarization combinations. Suitable antenna types may include, for example, patch antennas with heights from about ⅛ inches to about 6 inches and widths from about ⅛ inches to about 6 inch. Other antenna elements 204 types can be used, for example, meta-materials, dipole antennas among others. RFIC 206 may include a proprietary chip for adjusting phases and/or relative magnitudes of RF signals which may serve as inputs for antenna elements 204 for controlling pocket-forming. These RF signals may be produced using an external power supply 212 and a local oscillator chip (not shown) using a suitable piezoelectric material. Micro-controller 208 may then process information sent by a receiver through its own antenna elements for determining optimum times and locations for pocket-forming. In some embodiments, the foregoing may be achieved through communications component 210. Communications component 210 may be based on one or more wireless communication protocols, which may include BLUETOOTH®, WI-FI®, or ZIGBEE® wireless communication protocols. In addition, communications component 210 may be used to transfer other information such as an identifier for the device or user, battery level, location or other such information. Other communications component 210 may be possible which may include radar, infrared cameras, or sound devices for sonic triangulation for determining the device's position.

Figure 3:
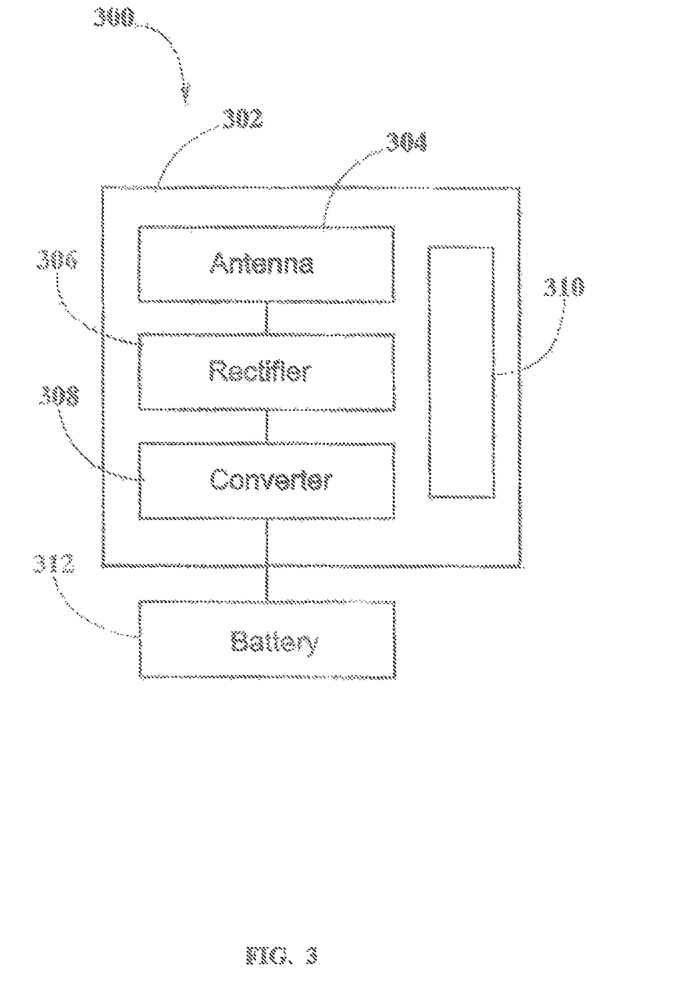
FIG. 3 illustrates a component level embodiment for a receiver, according to an exemplary embodiment.

FIG. 3 illustrates a component level embodiment for a receiver 300 which can be used for powering or charging an electronic device as exemplified in wireless power transmission 100. Receiver 300 may include a housing 302 where at least one antenna element 304, one rectifier 306, one power converter 308, and an optional communications component 310 may be included. Housing 302 can be made of any suitable material which may allow for signal or wave transmission and/or reception, for example plastic or hard rubber. Housing 302 may be an external hardware that may be added to different electronic equipment, for example in the form of cases, or can be embedded within electronic equipment as well. Antenna element 304 may include suitable antenna types for operating in frequency bands similar to the bands described for transmitter 200 from FIG. 2. Antenna element 304 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example a smartphone or portable gaming system. On the contrary, for devices with well-defined orientations, for example a two-handed video game controller, there might be a preferred polarization for antennas which may dictate a ratio for the number of antennas of a given polarization. Suitable antenna types may include patch antennas with heights from about ⅛ inches to about 6 inch and widths from about ⅛ inches to about 6 inch. Patch antennas may have the advantage that polarization may depend on connectivity, i.e., depending on which side the patch is fed, the polarization may change. This may further prove advantageous as a receiver, such as receiver 300, may dynamically modify its antenna polarization to optimize wireless power transmission. Rectifier 306 may include diodes or resistors, inductors or capacitors to rectify the alternating current (AC) voltage generated by antenna element 304 to direct current (DC) voltage. Rectifier 306 may be placed as close as is technically possible to antenna element 304 to minimize losses. After rectifying AC voltage, DC voltage may be regulated using power converter 308. Power converter 308 can be a DC-DC converter which may help provide a constant voltage output, regardless of input, to an electronic device, or as in this embodiment to a battery 312. Typical voltage outputs can be from about 5 volts to about 10 volts. Lastly, communications component 310, similar to that of transmitter 200 from FIG. 2, may be included in receiver 300 to communicate with a transmitter 200 or to other electronic equipment.

Figure 4:
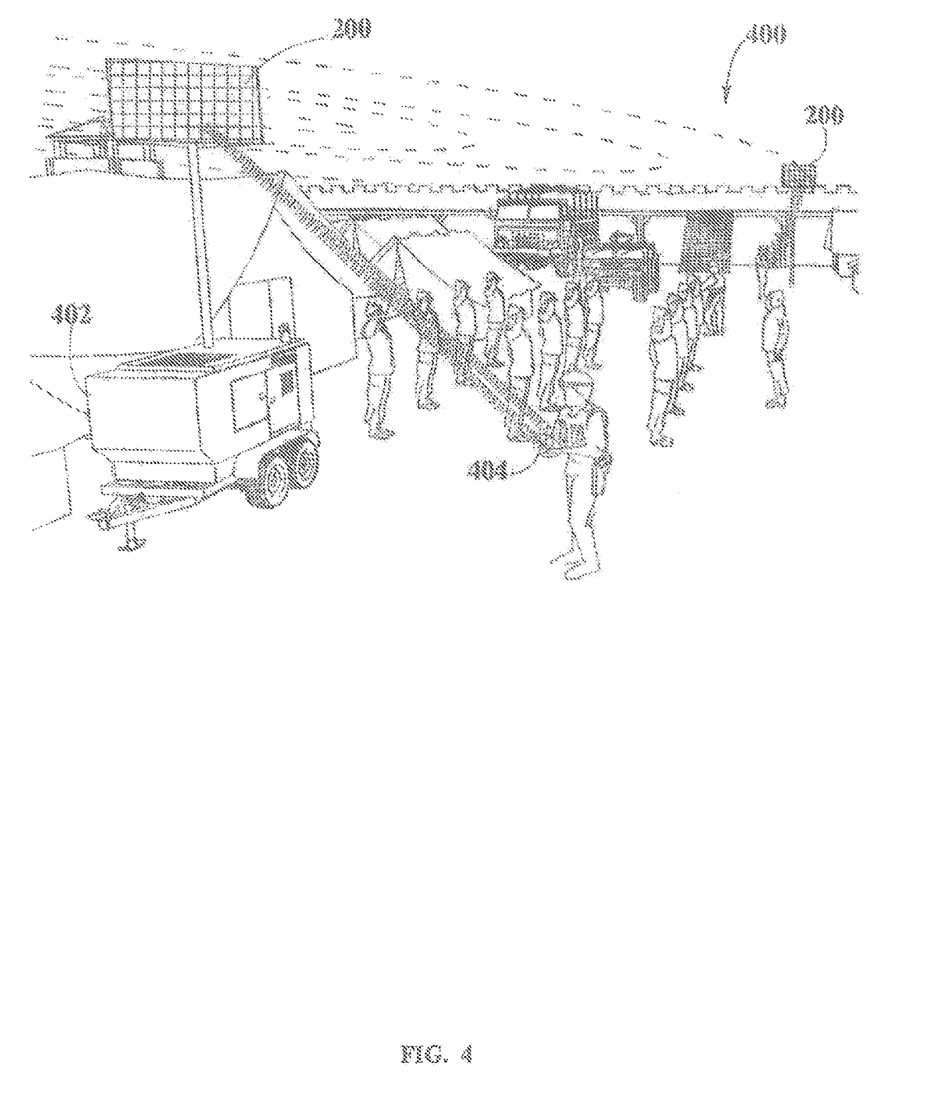
FIG. 4 illustrates a military camp with a wireless power distribution system, according to an exemplary embodiment.

FIG. 4 is an example embodiment of a power distribution system 400 in a military camp where troops may be settled in remote locations. Power distribution system 400 may include a mobile power generator 402, which may serve to power electrical equipment. Mobile power generator 402 may be a mobile diesel generator as illustrated in FIG. 4 or other sources such as solar photovoltaic arrays, wind turbines or any reliable power source or combination thereof. Coupled with mobile power generator 402 may be a transmitter 200, which may enable wireless power transmission 100. Transmitter 200 may use mobile power generator 402 as a power source to form pockets of energy 106. Pockets of energy 106 may form at constructive interference patterns and can be 3-dimensional in shape whereas null-spaces may be generated at destructive interference patterns. Electrical devices 404 such as radios, laptops or any devices requiring a power input may be coupled with a receiver 300. Receiver 300 may then utilize pockets of energy 106 produced by pocket-forming for charging or powering electrical devices 404.

Transmitter 200 may form pockets of energy 106 covering a range from about a few feet to hundreds of feet depending on the size of the antenna array. For the foregoing application, about 30 to about 60 feet may suffice. Additional transmitters 200 may be used to extend the distance in a power distribution system. A central transmitter 200 coupled with mobile power generator 402 may serve as a central distribution center while additional transmitters 200 may be placed at a distance and retransmit energy received from the central transmitter to reach greater distances. Each transmitter 200 size may be relative to the desired transmission distance.

Figure 5:
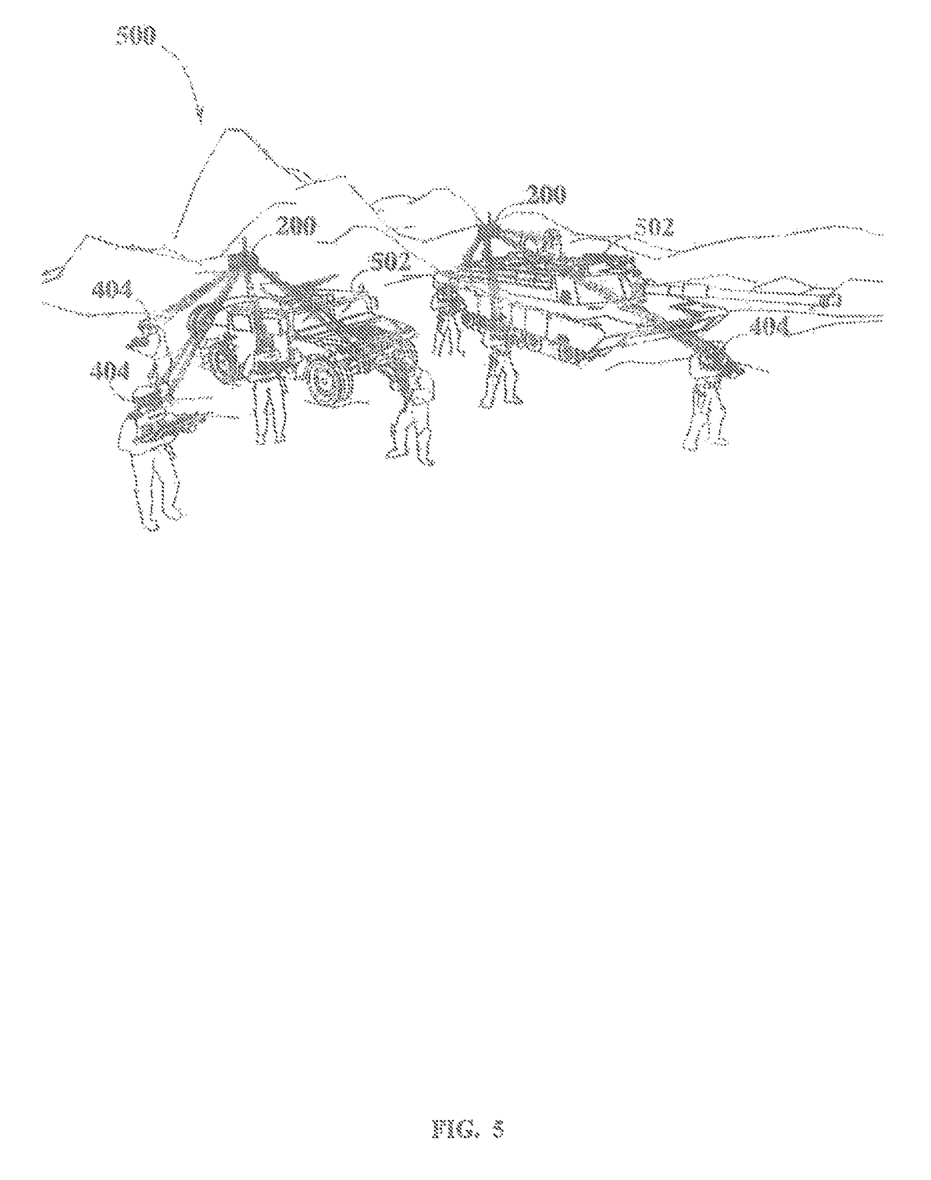
FIG. 5 illustrates a mobile power source for battlefield support, according to an exemplary embodiment.

FIG. 5 is another example embodiment of a power distribution system 500. A transmitter 200 coupled with a mobile power generator 402 may be mounted over a military vehicle 502 in order to add mobility. Military vehicle 502 may be any vehicle with enough robustness and ruggedness for battlefield applications such as a high mobility multipurpose wheeled vehicle (HMMWV/Humvee) armored trucks, tanks or any vehicle capable of carrying transmitter 200 coupled with mobile power generator 402. Military vehicle 502 may accompany soldiers into the battlefield and serve as a power source for electrical devices 404 carried by soldiers. Electrical devices 404 carried by soldiers may be coupled with receivers 300 in order to receive energy from transmitter 200.

Figure 6:
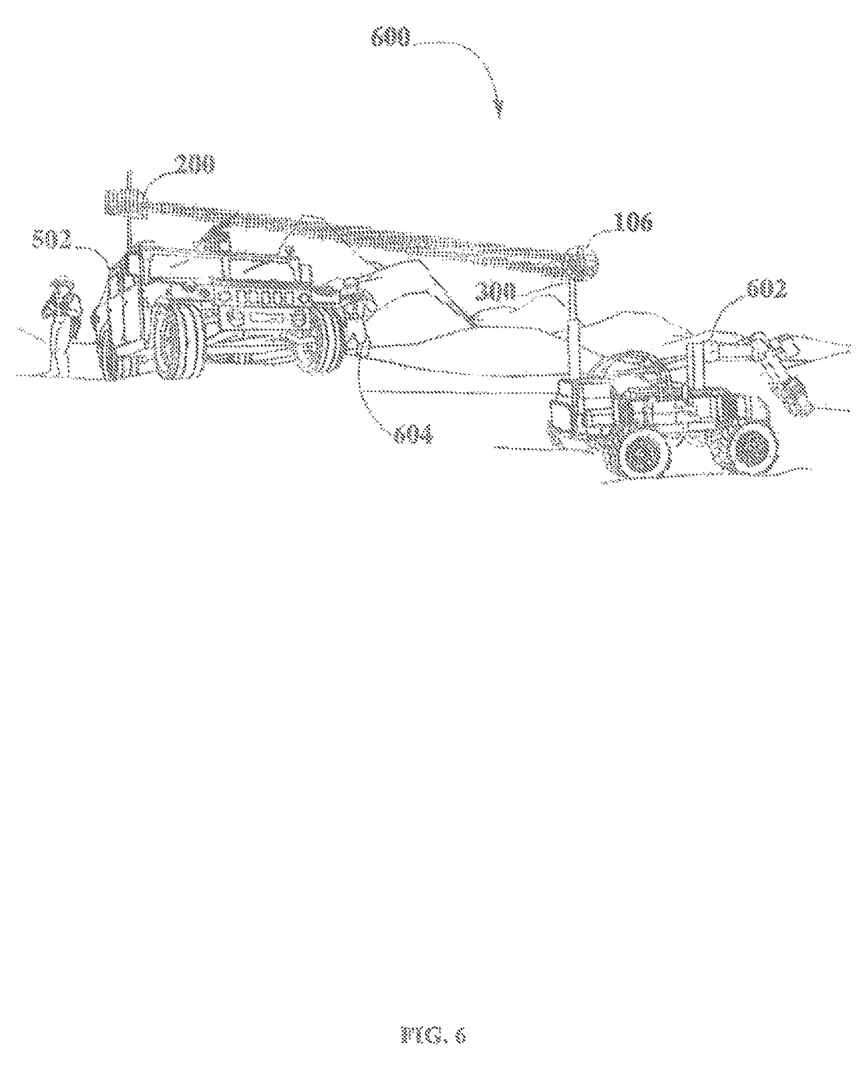
FIG. 6 illustrates a mobile power source for remote control vehicles, according to an exemplary embodiment.

FIG. 6 is another embodiment of power distribution system 600 where remote controlled vehicles 602 designed for espionage, detecting mines or disabling bombs may be powered wirelessly. In this embodiment, remote control and power may be critical factors to prevent exposure or harm to human soldiers 604. Remote controlled vehicle 602 may be coupled with a receiver 300. A transmitter 200 coupled with a mobile power generator 402 may form pockets of energy 106 at constructive interference patterns that may be 3-dimensional in shape whereas null-spaces may be generated at destructive interference patterns. A receiver 300 may then utilize pockets of energy 106 produced by pocket-forming for charging or powering remote controlled vehicle 602. While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method of secured wireless power transmission, the method comprising:
at a receiver having a communications component, at least one antenna element, and a rectifying circuit:
communicating, by the communications component of the receiver, a communications signal, which includes a security code, to a transmitter coupled to a power source, wherein the transmitter is configured to recognize the security code;
receiving, by the at least one antenna element of the receiver, energy from a plurality of power transmission waves that forms a constructive interference pattern proximate to a location of the receiver, wherein the transmitter transmits the plurality of power transmission waves in response to recognizing the security code communicated to the transmitter by the receiver; and
charging, using electricity generated by the rectifying circuit using the energy from the plurality of power transmission waves received by the at least one antenna element of the receiver, an electronic device that is coupled with the receiver.

2. The method of claim 1,
wherein:
the at least one antenna element of the receiver is in communication with at least one antenna element of the transmitter, and
the at least one antenna element of the transmitter transmits at least some of the plurality of power transmission waves.

3. The method of claim 1, wherein the transmitter includes a plurality of antennas, a radio frequency integrated circuit, a processor configured to implement a security logic used to recognize the security code, and a communications component.

4. The method of claim 1, wherein the receiver includes a power converter configured to receive the electricity from the rectifying circuit and generate a constant direct current voltage that is used to charge the electronic device.

5. The method of claim 1, wherein the communications component of the receiver communicates with the transmitter through signals sent using a wireless communication protocol.

6. The method of claim 1, wherein the transmitter, in response to recognizing the security code communicated to the transmitter by the receiver:
transmits the plurality of power transmission waves to form the constructive interference pattern in proximity to the receiver in response to determining that the receiver is within range of the transmitter; and
transmits the plurality of power transmission waves to a secondary transmitter, that is distinct and separate from the transmitter, in response to determining that the receiver is outside the range of the transmitter, wherein the secondary transmitter re-transmits the plurality of power transmission waves that forms the constructive interference pattern proximate to the location of the receiver.

7. The method of claim 1, wherein the constructive interference pattern proximate to the location of the receiver is regulated by the transmitter utilizing adaptive pocket-forming.

8. The method of claim 1, wherein the power source is a mobile generator mechanically coupled to the transmitter.

9. The method of claim 1, wherein the plurality of power transmission waves is a plurality of radio frequency (RF) power transmission waves.

10. The method of claim 9, wherein the transmitter is a far-field wireless power transmitter.

11. A wireless charging system for secured wireless charging of a mobile electronic device, the system comprising:
   a mobile electronic device coupled to a receiver;
   the receiver configured to communicate a security code to a transmitter; and
   the transmitter configured to:
      receive the security code from the receiver;
      recognize, using security logic of the transmitter, the security code; and
      in response to recognizing the security code, transmit a plurality of power transmission waves that forms a constructive interference pattern proximate to a location of the receiver,
   wherein the receiver is further configured to:
      receive, via an antenna element of the receiver, energy from the plurality of power transmission waves; and
      charge, using electricity generated using the energy from the plurality of power transmission waves received by the antenna element of the receiver, the mobile electronic device.

12. The wireless charging system of claim 11, further comprising:
   a secondary transmitter distinct and separate from the transmitter,
   wherein:
      the transmitter is further configured to, in response to determining that the receiver is outside a range of the transmitter, transmit the plurality of power transmission waves to the secondary transmitter; and
      the secondary transmitter is configured to re-transmit the plurality of power transmission waves that form a constructive interference pattern proximate to the location of the receiver.

13. The wireless charging system of claim 11, wherein the receiver further includes a power converter configured to generate a constant direct current voltage that is used to charge the mobile electronic device.

14. The wireless charging system of claim 11, wherein the plurality of power transmission waves is a plurality of RF power transmission waves.

15. The wireless charging system of claim 14, wherein the transmitter is a far-field wireless power transmitter.

16. A method of secure wireless charging of an electronic device, comprising: at a transmitter having a communications component, at least one processor, and a plurality of antenna elements: receiving, by the communications component, a communication signal from a receiver that includes a security code; analyzing via the at least one processor, using security logic of the transmitter, the security code received from the receiver; in response to recognizing the security code, transmitting, by at least some of the plurality of antenna elements, a plurality of power transmission waves that forms a constructive interference pattern proximate to a location of the receiver; and wherein at least one antenna element of the receiver receives energy from the plurality of power transmission waves transmitted by the transmitter; and the receiver, using electricity generated from the plurality of power transmission waves received from the transmitter, charges or powers an electronic device that is coupled with the receiver.

17. The method of claim 16, wherein transmitting the plurality of power transmission waves includes:
   transmitting the plurality of power transmission waves to the receiver in response to determining that the receiver is within range of the transmitter; and
   transmitting the plurality of power transmission waves to a secondary transmitter, distinct and separate from the transmitter, in response to determining that the receiver is outside the range of the transmitter, wherein the secondary transmitter re-transmits the plurality of power transmission waves that forms the constructive interference pattern proximate to the location of the receiver.

18. The method of claim 16, wherein the plurality of power transmission waves is a plurality of RF power transmission waves.

19. The method of claim 18, wherein the transmitter is a far-field transmitter.

* * * * *